United States Patent [19]

Drennen et al.

[11] Patent Number: 5,667,284
[45] Date of Patent: Sep. 16, 1997

[54] MANUALLY BACKDRIVABLE BALL SCREW ASSISTED BRAKING SYSTEM

[75] Inventors: David Bernard Drennen, Bellbrook; Ryan Lovell Wright, Dayton, both of Ohio

[73] Assignee: General Motors Corporation, Detroit, Mich.

[21] Appl. No.: 698,071

[22] Filed: Aug. 15, 1996

[51] Int. Cl.⁶ ........................................................ B60T 8/02
[52] U.S. Cl. .................. 303/115.2; 60/538; 188/72.8; 188/156
[58] Field of Search ................ 188/72.3, 72.7, 188/72.8, 152, 156, 158, 182, 196; 303/113.1, 115.2; 60/538, 545

[56] References Cited

U.S. PATENT DOCUMENTS

| | | | |
|---|---|---|---|
| 4,938,543 | 7/1990 | Parker et al. | 303/115.2 |
| 5,112,116 | 5/1992 | Boules et al. | 303/115.2 |
| 5,152,588 | 10/1992 | Bright et al. | 303/115.2 |
| 5,207,488 | 5/1993 | Newton et al. | 303/115.2 |
| 5,246,283 | 9/1993 | Shaw et al. | 303/115.2 |
| 5,348,123 | 9/1994 | Takahashi et al. | 188/72.8 |
| 5,499,865 | 3/1996 | Katagivi et al. | 303/115.2 |

*Primary Examiner*—Robert J. Oberleitner
*Assistant Examiner*—Chris Schwartz
*Attorney, Agent, or Firm*—Jeffrey A. Sedlar

[57] ABSTRACT

A manually backdrivable ball screw assisted braking system includes a ball drive operated by a reversible electric motor to effect linear translation of the piston resulting in selected pressurization of a wheel brake. The ball drive is assisted in operation by a manually backdrivable ball screw assembly operated by actuation of a hydraulic master cylinder by the manual application of force to the brake pedal.

8 Claims, 1 Drawing Sheet

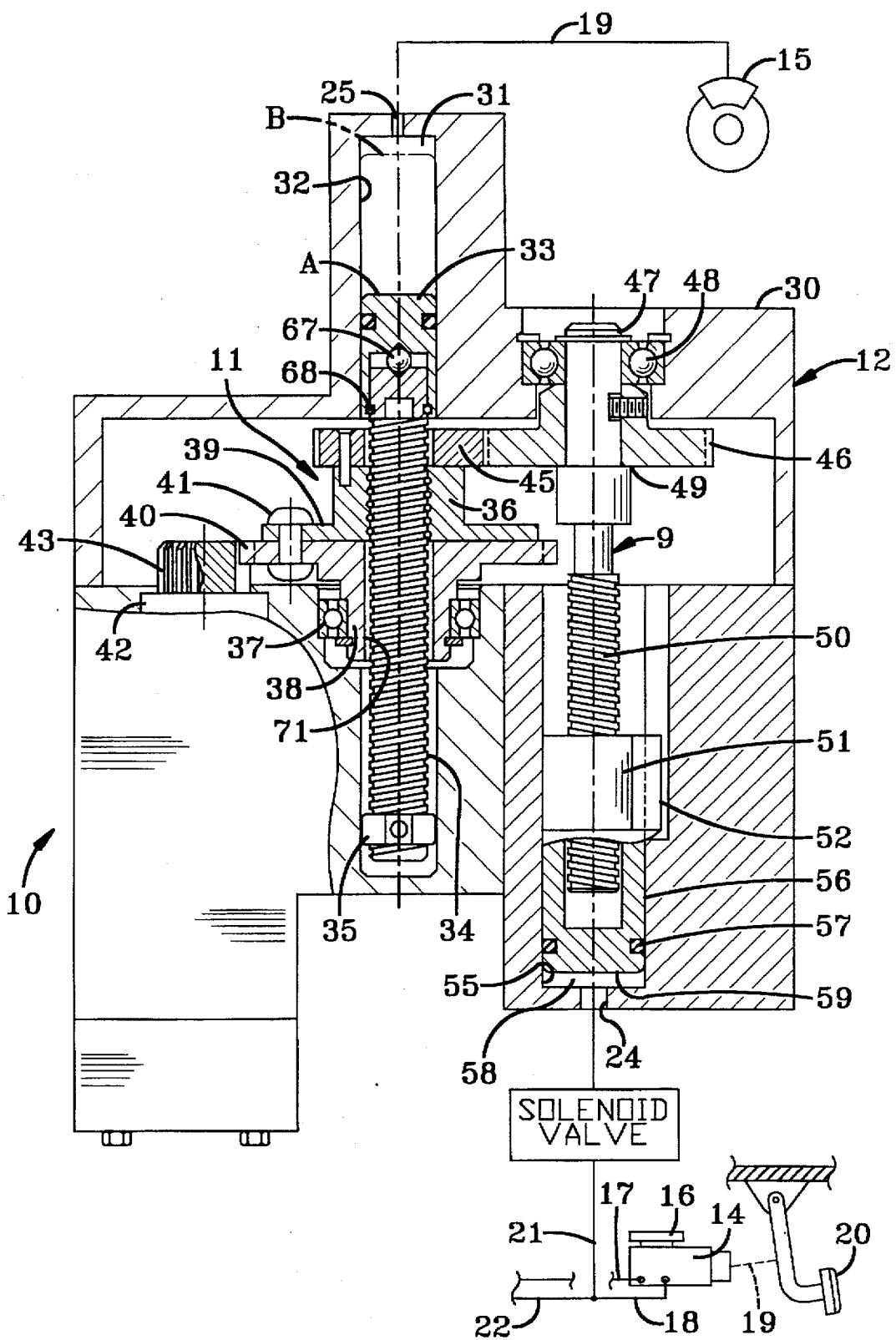

MANUALLY BACKDRIVABLE BALL SCREW ASSISTED BRAKING SYSTEM

BACKGROUND OF THE INVENTION

The present invention relates to a manually backdrivable ball screw assisted braking system and more particularly, to a braking system having a modulator with a powered pressure generating mechanism assisted by a manually backdrivable ball screw.

U.S. Pat. No. 5,246,283 describes an electro-hydraulic brake apply system for pressurizing a braking circuit. The braking system includes an actuator that effects pressurization of the braking system by turning a power screw through a motorized gear train. The power screw is threadably engaged with a nonrotative nut which drives a piston through reciprocable movement to control pressure within a wheel brake. The actuator provides pressure delivery functions and also functions as a pressure amplifier eliminating the need for a conventional master cylinder power booster.

To ensure that the vehicle operator experiences the brake pedal feel typically associated with braking system operation, an accumulator is provided. During normal braking operation of the system, fluid from the master cylinder flows into the accumulator which provides compliance. An accumulator shut-off valve is provided between the master cylinder and the accumulator and a normally open solenoid valve is provided between the accumulator and the actuator. The electro-hydraulic brake apply system provides normal braking, power assist, antilock braking and traction control modes of operation. The electro-hydraulic brake apply system uses one normally open solenoid valve per braking channel and also utilizes the separate accumulator for pedal feel emulation in the system. The accumulator uses a spring to provide an approximation of the conventional pedal feel associated with braking activity.

SUMMARY OF THE INVENTION

The present invention provides a manually backdrivable ball screw assisted braking system that eliminates the need for an independent pedal feel emulator and eliminates the need to use an independent normally open solenoid valve per braking channel. The braking system uses an actuator to provide selective pressurization of a fluid braking circuit.

Pressurization changes are effected by a signal delivered to an electric motor that turns a gear train and an interacting power nut which linearly drives a nonrotatable screw. The screw effects reciprocable movement of a piston to control the pressure delivered to an associated wheel brake. A manually pressurizable chamber is provided in the actuator which interacts with a second piston to linearly drive a nonrotatable nut effecting rotation of a ball screw. The ball screw is engaged by a gear that interacts with the rotatable nut of the actuator to provide assist in pressurization of the associated wheel brake.

As a resulting advantage, the initial pressurization of the wheel brake upon a manually initiated braking event is assisted by the backdrivable ball screw system as the motor is brought up to operational speed and torque. After an initial instant, the torque developed by the drive motor provides the main source of wheel brake fluid pressurization.

An additional advantage provided by the manually backdrivable ball screw is that the manually pressurizable chamber of the actuator is in communication with the braking system's master cylinder and therefore, provides direct feedback to the braking pedal. This direct feedback provides an input that is relative to the actual wheel brake pressurization and therefore, is reflective of the actual braking event rather than an emulation thereof.

BRIEF DESCRIPTION OF THE DRAWING

The FIGURE illustrates a manually backdrivable ball screw assisted braking system.

DETAILED DESCRIPTION OF THE PRESENTLY PREFERRED EMBODIMENT

Referring to the drawing, illustrated is a manually backdrivable ball screw assisted braking system designated in the aggregate as 10. In general the system 10 includes an actuator 12 interconnected in the circuit between a manually actuated unboosted master cylinder 14 and a wheel brake 15.

More specifically, a conventional dual piston master cylinder 14 is provided for separate pressurization of dual braking circuits which communicate with the master cylinder 14 through brake lines 17 and 18. Selective actuation of the master cylinder 14 is effected by push rod 19 which is engaged with pivotal brake pedal 20. The master cylinder 14 carries a conventional fluid reservoir 16 which provides for fluid makeup and storage requirements during operation of the system 10.

The brake line 18 feeds wheel brake 15 through the branch 21 and a second wheel brake (not illustrated) through the branch 22. The brake line 17 likewise feeds two wheel brakes either through individual branches like brake line 18 or through a commonly controlled branch. Manual actuation of the brake pedal 20 effects operation of the master cylinder 14 so that fluid is transferred to the brake lines 17 and 18 and pressurization of the fluid within the brake lines 17 and 18 including branches 21 and 22 occurs.

The branch 21 of brake line 18 includes, interposed therein, the actuator 12. The actuator 12 includes a master cylinder port 24 which is preferably in fluid communication with the master cylinder 14 at all times. Optionally, a closable valve, illustrated as an optional solenoid valve, (no reference number), in the branch 21, is provided in the branch 21 should it be preferable to selectively isolate the actuator 12 from the master cylinder 14. The actuator 12 also includes wheel brake port 25 which is in open fluid communication with wheel brake 15 at all times through branch line 19.

The actuator 12 includes a rigid housing 30 which is preferably configured to house a stack of plural actuators since the system associated with the master cylinder 14 will likely include more than one actuator. The housing 30 defines a chamber 31 which is variable in size as determined by the selected location of piston 33 which is slidably contained in bore 32 of housing 30. The piston 33 assists in defining the chamber 31 within the bore 32.

The connection between the screw driven mechanism 11 and the piston 33 includes a thrust bearing assembly including a single ball bearing 67 that is carried between the piston 33 and a notch in the end of drive screw 34. The drive screw 34 includes a groove and the piston 33 includes a corresponding groove for carrying retaining clip 68 which maintains engagement between piston 33 and drive screw 34 during longitudinal movement in the bore 32, maintaining the position of ball bearing 67. The piston 33 freely rotates on the ball bearing 67 relative to the drive screw 34.

Volumetric changes in the chamber 31 effected by translation of the piston 33 between the positions A and B result in a corresponding pressure increase or decrease which is communicated through the brake line 19 to the wheel brake 15. Therefore, the actuator 12, by means of linear translation of piston 33, effects application action or release action of the wheel brake 15 by creating a selected pressure increase or decrease in the chamber 31. Linear translation of the piston 33 is provided through operation of variable screw driven mechanism 11.

Screw driven mechanism 11 includes a threaded shaft designated as drive screw 34. Drive screw 34 is slidably and nonrotatably carried in the bore 32 by piston 33 and bearing 35 which is engaged with drive screw 34 and is slidably translatable in bore 32 but is nonrotatable. The drive screw 34 extends through rotatable nut 36 which is engaged with drive screw 34 by means of a plurality of ball bearings carried between the external threads of drive screw 34 and the internal threads of drive nut 36.

The drive nut 36 includes an integral flange 39 that is fastened to drive gear 40 by means of a plurality of fasteners 41. The drive gear 40 includes an integral cylindrical body 38 that engages the bearing 37. The drive nut 36 and drive gear 40 are rotatably supported on the housing 30 by the bearing 37. The drive screw 34 extends through the opening 71 of cylindrical body 38 with clearance.

Bi-directional rotation of the drive nut 36 is effected by electric motor 42 and drive gear 43 which engages gear 40. The electric motor 42 is securely carried by housing 30. In response to operation of the electric motor 42, linear translation of the piston 33 is effected by a corresponding linear translation of the drive screw 34, through rotation of the drive nut 36. The drive screw 34 includes a fixed pitch thread and therefore, the linear translation of the piston 33 within the bore 32, effected by rotation of drive nut 36 as driven by electric motor 42, is depended solely upon the speed of revolution of the electric motor 42.

A second drive gear 45 is secured to the drive nut 36 or is optionally formed as an integral part thereof. The second drive gear 45 is engaged with gear 46 of the assist drive assembly 9. Assist drive assembly 9 includes a primary shaft 47 which is rotatably supported on the housing 30 by bearing 48. The gear 46 is keyed onto the primary shaft 47 to rotate in concert therewith. Gear 46 is fixed in position between the bearing 48 and shoulder 49 of the primary shaft 47.

The primary shaft 47 includes a threaded portion 50 whose outer threads engage a plurality of ball bearings which are also engaged with internal threads of the nut 51. The nut 51 includes a ball return 52 which also operates to prevent rotation of the nut 51 within the bore 55. The nut 51 is fixed to, or optionally integrally formed with, piston 56.

Piston 56 is slidably contained within bore 55 and includes a seal 57 to provide a fluid tight closure for the chamber 58. When the system 10 is at rest and fluid pressure within the chamber 31 is essentially at atmospheric, the manual application of force to brake pedal 20 results in pressurization of the brake line 18 including the branch 21 through means of master cylinder 14. This fluid pressure is communicated to chamber 58 and acts upon the surface 59 of piston 56. This effects linear translation of the nut 51 within the bore 55 effecting rotation of the primary shaft 47 and the connected gear 46.

Rotation of the gear 46, in a direction in response to increasing pressure in the chamber 58, effects rotation of the gear 45 and connected drive nut 36 of the ball drive 11 effecting linear translation of the drive screw 34 in a manner that effects linear translation of the piston 33 from the point A toward the point B effecting an increase in pressure in brake line 19 caused by a reduction in volume of the chamber 31. This instantaneous apply assist is effected on the initial actuation of the brake pedal 20.

Upon increasing brake application, the operation of motor 42 through drive gear 43 and gear 40 effects rotation of drive nut 36 resulting in linear translation of the drive screw 34 in a manner that causes piston 33 to translate toward position B, assuming the primary driving force and pressurization of the chamber 31 and the brake line 19 in actuating the wheel brake 15. A reduction in the application of force to the wheel brake 20 results in a reversal in direction of the electric motor 42 effecting linear translation of the piston 33 back toward the position A and reducing fluid pressure in the chamber 31 and brake line 19 effecting a release of the wheel brake 15. During this electronically controlled operation to pressurize the brake line 19 and operate the wheel brake 15, the fluid pressure in chamber 58 is fed back through the branch 21 and brake line 18 directly to the master cylinder 14 providing a feedback loop between the wheel brake 15 and the brake pedal 20.

When the brake pedal 20 is released, the electric motor 42 drives the piston 33 through the screw driven mechanism 11 back to the position A and returns the piston 56 back to its illustrated home position. Excess fluid in the system is pumped back to the reservoir 16 through the master cylinder 14.

In addition to manually actuated braking action as initiated by operation of the brake pedal 20, the electric motor 42 is operable through electronic control to actuate the wheel brake 15. Automatic operation is effected through the ball drive 11 to initiate such functions as traction control.

The apply assist effected upon the initial actuation of the brake pedal 20 operates to take-up the inherent compliance in the system 10. Compliance may exist due to such factors as movement in the wheel brake 15 to initiate contact between brake pads and friction surfaces, and other minimal factors such as brake line expansion. With the compliance being taken up during apply assist operation, automatic modulation of the pressure at wheel brake 15 by movement of the piston 33 is effected with relatively small linear movements of the drive screw 34.

What is claimed is:

1. A braking system comprising:
    an actuator having a screw drive including a drive screw connected to a first piston so that the drive screw and first piston are translatable linearly through the actuator;
    a drive nut disposed about the drive screw and engaging a first gear and a second gear and being rotatable and fixed against linear translation within the actuator;
    an electric motor engaging the first gear and being reversibly rotatable to rotate the first gear and the drive nut;
    an assist gear engaging the second gear and being rotatable to rotate the second gear and the drive nut;
    a threaded shaft engaging the assist gear;
    a nonrotatable nut disposed about and engaging the threaded shaft;
    a second piston connected to the nonrotatable nut wherein the second piston is linearly translatable to effect rotation of the drive nut and linear translation of the first piston.

2. A braking system comprising:
    a wheel brake;
    a master cylinder;
    a brake line extending between the wheel brake and the master cylinder;

an actuator interposed in the brake line including a first variable chamber communicating with the wheel brake through the brake line and a second variable chamber communicating with the master cylinder through the brake line;

wherein the actuator includes a first piston operated by a screw driven mechanism to automatically adjust the first variable chamber and a second piston operating an assist screw drive, the assist screw drive engaging the screw driven mechanism so that a first pressure effected in the second variable chamber by operation of the master cylinder moves the assist screw drive to drive the screw driven mechanism generating a second pressure in the first variable chamber.

3. A braking system according to claim 2 wherein the screw driven mechanism includes a rotatable nut with a first drive gear connected to the rotatable nut and the assist screw drive includes a rotatable shaft with an assist drive gear fixed on the rotatable shaft and meshing with the drive gear.

4. A braking system according to claim 3 wherein the screw driven mechanism includes a second drive gear connected to the rotatable nut and a motor having a motor drive gear meshing with the second drive gear.

5. A braking system according to claim 4 wherein the assist screw drive includes a nonrotatable piston engaging the rotatable shaft and being linearly translatable within the actuator.

6. An actuator comprising:

a housing having a first variable chamber and a second variable chamber;

a first piston operated by a screw driven mechanism to automatically adjust the first variable chamber and a second piston operating an assist screw drive, the assist screw drive engaging the screw driven mechanism so that a first pressure selectively effected in the second variable chamber moves the assist screw drive to drive the screw driven mechanism generating a second pressure in the first variable chamber;

the screw driven mechanism including a rotatable nut with a first drive gear connected to the rotatable nut; and the assist screw drive including a rotatable shaft with an assist drive gear fixed on the rotatable shaft and meshing with the drive gear.

7. An actuator according to claim 6 wherein the screw driven mechanism includes a second drive gear connected to the rotatable nut and a motor having a motor drive gear meshing with the second drive gear.

8. An actuator according to claim 7 wherein the assist screw drive includes a nonrotatable piston engaging the rotatable shaft and being linearly translatable within the actuator.

* * * * *